US006793376B2

(12) United States Patent
Kobayashi

(10) Patent No.: US 6,793,376 B2
(45) Date of Patent: Sep. 21, 2004

(54) LIGHTING DEVICE WITH LIGHT-CONDENSING DEVICE

(75) Inventor: Ayumu Kobayashi, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 16 days.

(21) Appl. No.: 10/235,776

(22) Filed: Sep. 5, 2002

(65) Prior Publication Data

US 2003/0063468 A1 Apr. 3, 2003

(30) Foreign Application Priority Data

Sep. 7, 2001 (JP) .......................................... 2001-272041

(51) Int. Cl.⁷ ................................................ F21V 5/00
(52) U.S. Cl. ....................... 362/326; 362/551; 362/309; 362/332; 362/336
(58) Field of Search ................................. 362/326, 551, 362/459, 520, 522, 521, 257, 308, 309, 331, 332, 335, 336, 31; 359/621, 627, 628, 385, 619

(56) References Cited

U.S. PATENT DOCUMENTS 2,215,900 A * 9/1940 Bitner ........................ 362/309
5,428,469 A * 6/1995 Willett ............................ 349/9
6,547,422 B2 * 4/2003 Tiao et al. ................... 362/298

FOREIGN PATENT DOCUMENTS

JP  58-192022  * 11/1983  ............ G03B/21/62

* cited by examiner

Primary Examiner—Stephen Husar
Assistant Examiner—Sharon Payne
(74) Attorney, Agent, or Firm—Brinks Hofer Gilson & Lione

(57) ABSTRACT

A lighting device includes a light-condensing device having annular portions of a substantially semi-circular section, formed on a periphery of a convex lens, in which the light-condensing device is disposed in a state that a light-incoming plane of the convex lens and first inner wall surfaces of the annular portions are made to face a light source (lamp). And, lights from the light source falling on the light-condensing device are set to efficiently travel from the light-outgoing plane of the convex lens and second inner wall surfaces of the annular portions toward a small specific area such as a light-incoming end surface of a light-guiding device. Thereby, the lights from the light source can effectively be used for lighting.

11 Claims, 3 Drawing Sheets

LIGHTING DEVICE WITH LIGHT-CONDENSING DEVICE

BACKGROUND OF THE INVENTION

1. Field of the Invention

The present invention relates to a lighting device, specifically to a lighting device that guides lights from a light source such as an illumination lamp to lighting areas through a light-guiding device.

2. Description of the Related Art

Most control panels for on-vehicle equipment incorporate a lighting device that illuminates the operation keys on the panels in dark places. In such a lighting device, usually a light-incoming end surface provided on the rear of a light-guiding device made of acrylic resin or the like is faced to a light source such as a lamp, and light-outgoing end surfaces provided on the fronts of the light-guiding device are faced to the lighting areas of the operation keys, so that the outgoing lights from the light source can be guided to the lighting areas through the light-guiding device.

Now, lights from the light source radiate in all directions, and in order to guide the lights efficiently to the lighting areas, it is conceivably advantageous to expand the area of the light-incoming end surface of the light-guiding device, and to shorten the distance from the light source as much as possible. However, using a thick light-guiding device with an enlarged diameter of the end surface will enlarge the light-guiding device and increase the weight thereof as well, which creates a problem that decreases the space-occupancy factor because of the prolonged focal length and extremely deteriorates the facility in handling. In addition, there is a necessity of securing a specific clearance between the light-guiding device and the light source in order that the heat generated by the light source will not melt the light-guiding device. Therefore, in this type of lighting device, a conventional construction is generally adopted which arranges plural light sources to illuminate the lighting areas in a desired brightness because only a slight portion of the lights from the light source can be guided to the lighting areas.

As mentioned above, the conventional lighting device that irradiates the lighting areas in a desired brightness by arranging plural light sources wastes most of the lights from the light source, which is an inefficient construction. Also, the plural light sources have to be mounted at the specific positions, which involves a problem that increases the costs of components and the assembling cost.

Now, there is another technique put forward, in which a curved reflection membrane is provided near the light source, and most of the lights from the light source traveling in a direction diverted from the light-incoming end surface of the light-guiding device are reflected by the reflection membrane to be guided to the end surface. However, since it is difficult to inexpensively manufacture a reflection membrane that is curved in a specified shape, the technique cannot be considered effective in view of achieving reduction in costs.

SUMMARY OF THE INVENTION

The present invention has been made in view of the circumstances of the above conventional techniques, and it is an object of the invention to provide a lighting device that efficiently condenses the lights from the light source to a small specific area, and irradiates the lighting areas in a desired brightness at a low cost with a space saved.

In order to accomplish the foregoing object, the lighting device of the invention includes a light source and a light-condensing device placed to face the light source, which is made of a material of high transmittance. The light-condensing device includes a convex lens having a light-incoming plane and a light-outgoing plane that are convexly curved, and annular portions integrally formed on a periphery of the convex lens, whose section is substantially semicircular and whose dimension of thickness in an axial direction is enlarged toward the outside in a radial direction. And, the lighting device is constructed such that lights from the light source fall on the light-incoming plane of the convex lens and first inner wall surfaces of the annular portions and go out from the light-outgoing plane of the convex lens and second inner wall surfaces of the annular portions toward a specific area.

In the lighting device thus constructed, not only do lights falling on the light-incoming plane of the convex lens from the light source receive a light-condensing effect but also lights falling on the first inner wall surfaces of the annular portions from the light source are reflected on the outer wall surfaces of the annular portions to receive the light-condensing effect; therefore, laying out the light-condensing device in a state that the light-incoming plane and the first inner wall surfaces face the light source permits most of the lights falling on the light-condensing device from the light source to travel to a small specific area through the light-outgoing plane of the convex lens and the second inner wall surfaces of the annular portions. That is, laying out the light-condensing device in the vicinity of the light source will reduce the rate of the lights that are not used for illumination and are wasted, which makes it possible to irradiate the lighting areas in a desired brightness with a limited number of the light source and to save the provision of the reflection membrane separately.

Also in this construction, if portions of the outer wall surfaces of the light-condensing device, which are located on peripheries of the first inner wall surfaces, are formed into tapered planes such that an aperture thereof decreases gradually toward the light source, the lights from the light source passing through the first inner wall surfaces will arrive at the tapered planes with a large angle of incidence. Accordingly, the tapered planes can totally reflect most of the lights, and the lights reflected on the tapered planes can easily travel to reach the small area. Therefore, if there is a slight dislocation in the light-emitting portion of the light source, or if the light-emitting portion is not a point light source as the case with a filament light source, the tapered planes will restrain the lights from leaking out of the outer wall surfaces of the light-condensing device, and also restrain the reflected lights on the outer wall surfaces from diffusing; thus, the lights from the light source can effectively be used for lighting.

The lighting device of the invention will enhance the practical value by providing a construction that makes the lights from the light source travel to the light-incoming end surface of the light-guiding device through the light-condensing device. That is, by providing a construction such that one end surface (light-incoming end surface) of the light-guiding device is disposed at a position that faces the light-outgoing plane of the convex lens, so that the light-condensing device makes the lights from the light source go out to the one end surface, and the other end surfaces (light-outgoing end surfaces) of the light-guiding device are disposed at positions that face the lighting areas, it is possible to make the lights from the light source efficiently travel to the small light-incoming end surface through the light-condensing device. Thereby, it becomes possible to irradiate the lighting areas in a desired brightness without providing plural light sources and a reflection membrane and to prevent the light-guiding device from expanding the size and increasing the weight.

DETAILED DESCRIPTION OF THE PREFERRED EMBODIMENT

Figure 1:
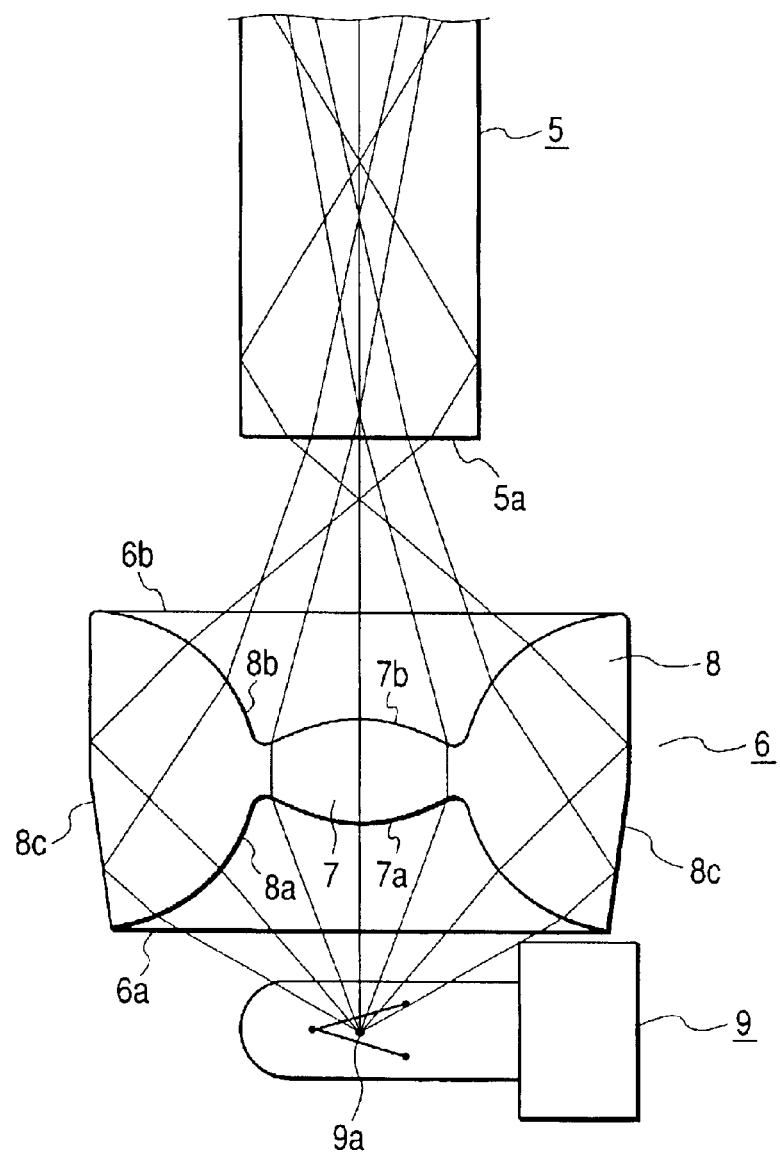
FIG. 1 is a chart to explain a major part of a lighting device relating to the embodiment of the invention.
Figure 2:
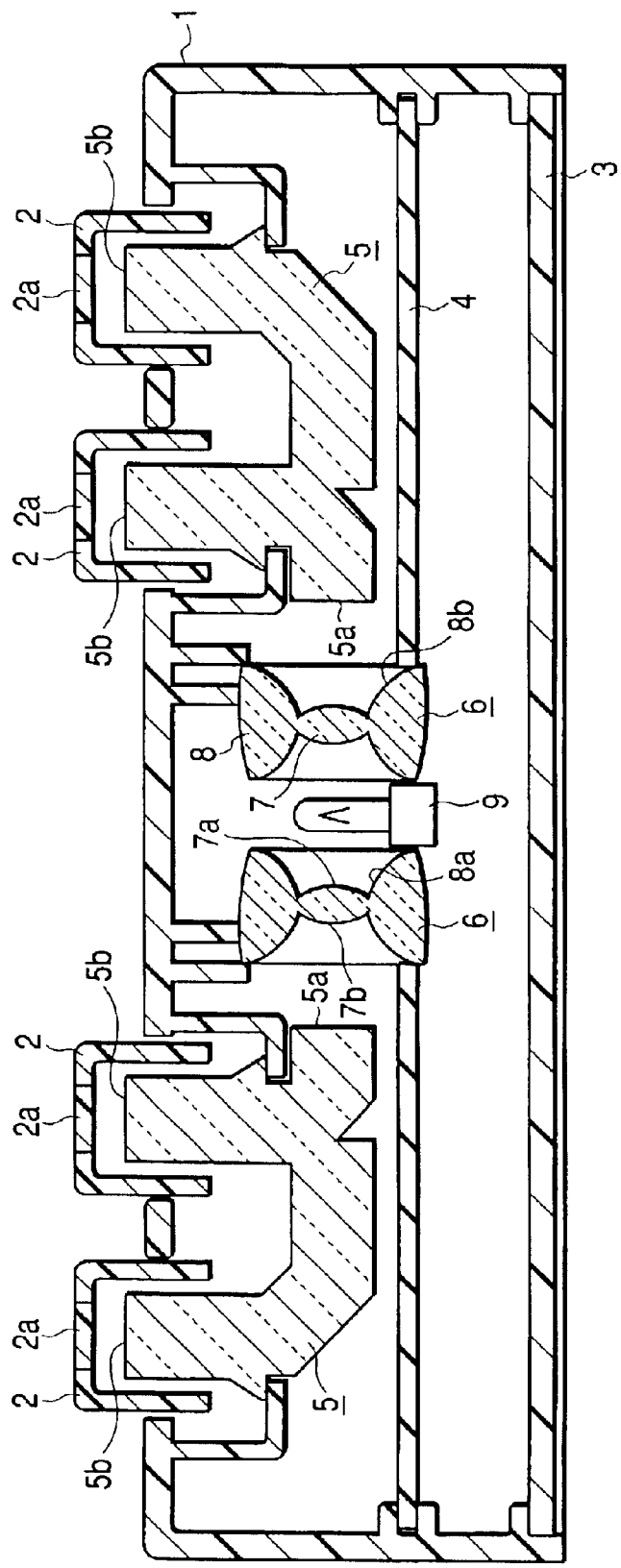
FIG. 2 is an entire construction chart of the lighting device.

The preferred embodiment of the invention will be described with reference to the accompanying drawings, in which FIG. 1 illustrates a major part of a lighting device relating to the embodiment of the invention, FIG. 2 illustrates a total construction of the lighting device, and FIG. 3 illustrates light paths in case there is a dislocation in the light-emitting portion of a light source, with the case (a) of the embodiment and the case (b) of a comparison example.

The lighting device illustrated in FIG. 1 and FIG. 2, being incorporated in a case 1 of an on-vehicle control panel or the like, is used for illuminating operation keys 2 in a dark place. In FIG. 2, the numerical symbol 3 signifies a cover that closes the back of the case 1, and the symbol 4 signifies a circuit board installed in the case 1. The lighting device is composed of, in a rough sense, light-guiding devices 5 retained by the case 1, made of a material of high transmittance such as acrylic resin, light-condensing devices 6 disposed in the vicinity of light-incoming end surfaces 5a of the light-guiding devices 5, also made of a material of high transmittance such as acrylic resin, and a lamp 9 mounted on the circuit board 4, which supplies lights to lighting areas 2a of the operation keys 2. Light-outgoing end surfaces 5b provided on the front portions of the light-guiding devices 5 are made to face the backsides of the lighting areas 2a of the operation keys 2. Here, the lighting device is provided with each two of the light-guiding devices 5 and the light-condensing devices 6, and the lamp 9 is installed in the middle of the two light-guiding devices 5 that are incorporated in remote places inside the case 1, and each of the light-condensing devices 6 is disposed between the lamp 9 and each of the light-guiding devices 5.

Each of the light-condensing devices 6 includes a convex lens 7 having a light-incoming plane 7a and a light-outgoing plane 7b that are formed in a convexly curved plane, and annular portions 8 integrally formed on the periphery of the convex lens 7, whose section is substantially semi-circular, whose dimension of thickness in the axial direction is enlarged toward the outside in the radial direction. As can be seen in FIG. 1, the axial direction is vertical and the radial direction is horizontal. The light-condensing devices 6 are retained on the circuit board 4 in a state that the light-incoming plane 7a of the convex lens 7 and first inner wall surfaces 8a of the annular portions 8 that lead to one opening end 6a while surrounding the light-incoming plane 7a and curving outward are made to face the lamp 9. Of the outer wall surfaces of each of the light-condensing devices 6, the portions located on the peripheries of the first inner wall surfaces 8a are formed into tapered planes 8c such that the aperture thereof decreases gradually on the side of the opening end 6a that faces the lamp 9. And, by disposing each of the light-condensing devices 6 in an appropriate position in consideration of the positional relation with the lamp 9 and the light-guiding device 5, the lights emitted by the light-emitting portion 9a of the lamp 9 are set to efficiently go out to the light-incoming end surface 5a of the corresponding light-guiding device 5, from the light-outgoing plane 7b of the convex lens 7 of the light-condensing device 6 and second inner wall surfaces 8b of the annular portions 8 that lead to the other opening end 6b, while surrounding the light-outgoing plane 7b and curving outward.

That is, the light-condensing devices 6, the lamp 9, and the light-guiding devices 5 are disposed in a positional relation as illustrated in FIG. 2, so that most of the lights radially emitted by the light-emitting portion 9a of the lamp 9 are designed to fall on the light-incoming planes 7a each and the first inner wall surfaces 8a each of the two light-condensing devices 6 that face each other to put the lamp 9 in between. The lights from the lamp 9 penetrating into the light-condensing device 6 travel through the light paths as illustrated in FIG. 1 to the light-incoming end surface 5a of the light-guiding device 5. Concretely, since the lights from the lamp 9 falling on the light-incoming plane 7a of the light-condensing device 6 receive the light-condensing effect of the convex lens 7, the lights are to go out from the light-outgoing plane 7b to the center of the light-incoming end surface 5a of the light-guiding device 5. And, since the lights from the lamp 9 falling on the first inner wall surfaces 8a of the light-condensing device 6 are likely to be reflected on the outer wall surfaces including the tapered planes 8c, the lights travel at a high rate to the light-incoming end surface 5a of the light-guiding device 5 through the second inner wall surfaces 8b. Moreover, since the light-emitting portion 9a of the lamp 9 is covered with the light-incoming plane 7a and the first inner wall surfaces 8a of the light-condensing device 6, most of the lights from the lamp 9 are to travel to the small light-incoming end surface 5a of the light-guiding device 5 after falling on the light-condensing device 6, and the lights from the lamp 9 are to be efficiently supplied to the light-outgoing end surface 5b of the light-guiding device 5. Therefore, using only one lamp 9 for the light source will irradiate in a desired brightness the lighting areas 2a each of the plural operation keys 2 arranged dispersedly on the front of the case 1.

Thus, in the lighting device relating to the embodiment, interposing the light-condensing devices 6 between the lamp 9 and the light-guiding devices 5 will efficiently supply the lights from the lamp 9 to the light-incoming end surfaces 5a of the light-guiding devices 5, and will reduce the rate of the lights that are not used for lighting and are wasted; accordingly, mounting plural light sources for lighting becomes unnecessary, and providing reflection membranes separately are not needed. Therefore, the invention allows manufacturing at a low cost the lighting device that can illuminate the lighting areas 2a each of the plural operation keys 2 with a sufficient brightness.

Figure 3A:
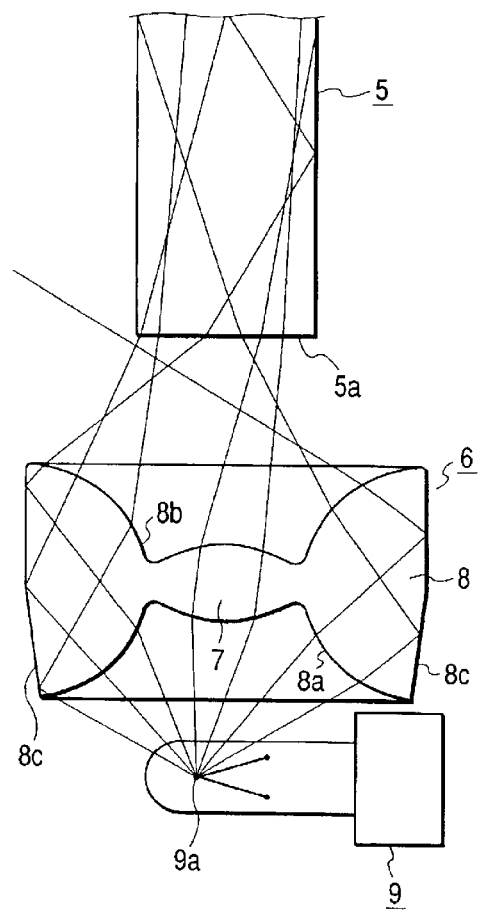
FIGS. 3A and 3B are charts of light paths in the case where there is a dislocation in the light-emitting portion of a light source, which illustrates the case of the embodiment and light paths of a comparison example.
Figure 3B:
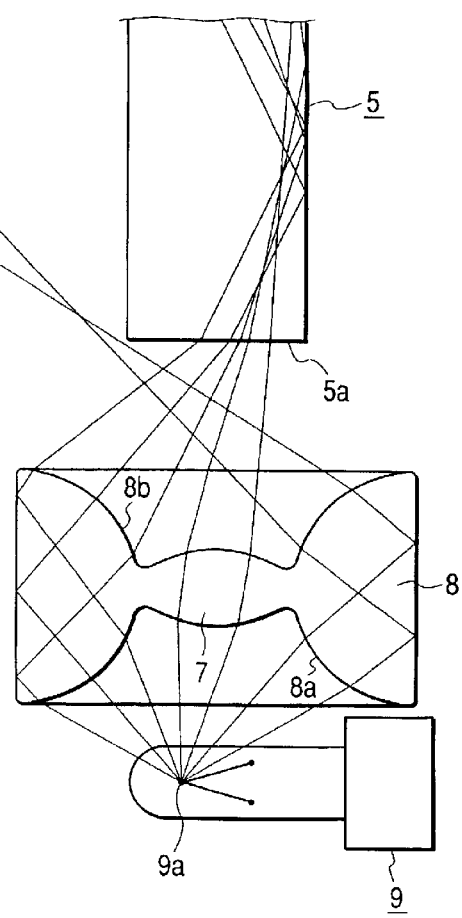

Also, in the lighting device relating to the embodiment, of the outer wall surfaces of the light-condensing devices 6, the portions located on the peripheries of the first inner wall surfaces 8a are formed into the tapered planes 8c; accordingly, if there is a slight dislocation in the light-emitting portion 9a of the lamp 9, most of the lights from the lamp 9 passing through the first inner wall surfaces 8a are to travel to the light-incoming end surfaces 5a of the light-guiding devices 5. In other words, when all the outer wall surfaces of the light-condensing device 6 are formed into a cylindrical surface as shown in FIG. 3B, for example, the lights emitted by the light-emitting portion 9a dislocated left in the drawing from the ideal position (refer to FIG. 1), which have passed through the first inner wall surfaces 8a of the light-condensing device 6, arrive at the right outer wall surface of the light-condensing device 6 in the drawing with a comparably small angle of incidence; accordingly, leak lights from the outer wall surface increase, and the lights reflected on the outer wall surface are likely to travel in a direction diverted from the light-incoming end surface 5a of the light-guiding device 5. On the contrary, when the tapered planes 8c are formed on the outer wall surfaces of the light-condensing device 6 as in this embodiment, the lights emitted by the light-emitting portion 9a slightly dislocated arrive at the tapered planes 8c with a comparably large angle of incidence after passing through the first inner wall surfaces 8a of the light-condensing device 6, as shown in FIG. 3A; accordingly, the tapered planes 8c are able to totally reflect most of the lights to restrict leak lights, and also the tapered planes 8c are able to make most of the lights reflected thereon travel to the light-incoming end surface 5a of the light-guiding device 5. Consequently, this construction allows a dislocation of the light-emitting portion 9a of the lamp 9 to a certain extent, which improves the production yield and makes it easy to secure high reliability.

When the light-emitting portion 9a is not a point light source, as the case with a filament light source, setting the cone angle of the tapered planes 8c to an appropriate value will make it possible to manufacture the light-condensing device 6 that displays an excellent light-condensing effect with leak lights suppressed. And, the other constructions may be taken, such as: arranging three or more light-condensing devices 6 on the surrounding of the lamp 9 according to the shape or the size of the light-guiding device 5, or arranging only one light-condensing device 6 to cover the light-emitting portion of the light source.

Being implemented by the embodiment as described above, the invention displays the following effects.

The lighting device according to the invention enables most of the lights falling on the light-incoming plane and the first inner wall surfaces of the light-condensing device to travel to a small specific area from the light-outgoing plane and the second inner wall surfaces of the light-condensing device; consequently, the rate of the lights that are not used for lighting and are wasted is reduced, which makes it possible to irradiate the lighting areas in a sufficient brightness with a limited number of the light source. And, it becomes unnecessary to provide a reflection membrane separately. That is, the lighting device according to the invention is able to efficiently condense the lights from the light source to a small specific area such as the light-incoming end surface of the light-guiding device, by interposing the light-condensing device; and it becomes possible to irradiate the lighting areas in a desired brightness at a low cost with a space saved.

What is claimed is:
1. A lighting device comprising:
   a light sources; and
   a light-condensing device placed to face the light source, wherein the light-condensing device includes:
      a convex lens having a light-incoming plane and a light-outgoing plane that are convexly curved and oppose each other in an axial direction, and
      annular portions integrally formed on a periphery of the convex lens in a radial direction of the convex lens, each annular portion having: a first convexly curved inner wall surface on which light from the light source impinges, a second convexly curved inner wall surface from which the light in the annular portion exits, and an outer wall surface at an end of the annular portion in the radial direction;
   wherein lights from the light source falling on the light-incoming plane of the convex lens exits from the light-outgoing plane of the convex lens toward a specific area, and
   wherein light from the light source falling on the first inner wall surfaces of the annular portions and reflected by the outer wall surfaces exits from the second inner wall surfaces of the annular portions toward the specific area.

2. A lighting device according to claim 1, wherein, portions of the outer wall surfaces of the light condensing device, disposed along the radial direction from the first inner wall surfaces are formed into tapered planes such that an aperture thereof decreases gradually toward the light source.

3. A lighting device according to claim 1, further comprising lighted portions having lighting areas irradiated with the light from the light source, wherein one end surface of a light-guiding device is disposed at a position that faces the light-outgoing plane of the convex lens, and wherein other end surfaces of the light-guiding device are disposed at positions that face the lighting areas.

4. A lighting device according to claim 2, further comprising lighted portions having lighting areas irradiated with the lights from the light source, wherein one end surface of a light-guiding device is disposed at a position that faces the light-outgoing plane of the convex lens, and wherein other end surfaces of the light-guiding device are disposed at positions that face the lighting areas.

5. A lighting device according to claim 1, wherein a thickness of each annular portion at an end of the light-condensing device is larger than a maximum thickness of the convex lens.

6. A lighting device according to claim 5, wherein a maximum thickness of each annular portion occurs at the end of the light-condensing device.

7. A lighting device according to claim 1, the light-condensing device further comprising a first open end and a second open end parallel with the first open end, the first open end more proximate to the light source than the second open end, wherein the outer wall surfaces of the light-condensing device more proximate to the first open end than the second open end taper toward a center of the light-condensing device.

8. A lighting device according to claim 7, wherein the outer wall surfaces taper symmetrically towards the center of the light-condensing device.

9. A lighting device according to claim 1, wherein the light source is disposed along a central axis of light-condensing device in the axial direction.

10. A lighting device according to claim 1, wherein the convex lens and annular portions have substantially equal focal lengths.

11. A lighting device according to claim 1, wherein the annular portions are substantially semi-circular in cross-section in the radial direction.

* * * * *